United States Patent
Lontka

(10) Patent No.: US 8,159,361 B2
(45) Date of Patent: Apr. 17, 2012

(54) METHODS AND APPARATUS FOR PROVIDING POWER TO A NOTIFICATION APPLIANCE CIRCUIT

(75) Inventor: Karen D. Lontka, Randolph, NJ (US)

(73) Assignee: Siemens Industry, Inc., Alphaetta, GA (US)

( * ) Notice: Subject to any disclaimer, the term of this patent is extended or adjusted under 35 U.S.C. 154(b) by 406 days.

(21) Appl. No.: 12/148,288

(22) Filed: Apr. 17, 2008

(65) Prior Publication Data
US 2008/0272654 A1    Nov. 6, 2008

Related U.S. Application Data

(60) Provisional application No. 60/914,457, filed on Apr. 27, 2007, provisional application No. 60/914,151, filed on Apr. 26, 2007.

(51) Int. Cl.
*G08B 21/00* (2006.01)
(52) U.S. Cl. .............. 340/636.1; 340/286.05; 340/426.1; 340/825.36
(58) Field of Classification Search ............... 340/636.1, 340/635, 501, 506, 286.04, 286.05, 691.1, 340/426.1, 426.24, 426.25, 428, 517, 518, 340/521, 511, 825.36, 7.2, 7.38, 7.32
See application file for complete search history.

(56) References Cited

U.S. PATENT DOCUMENTS

| | | | |
|---|---|---|---|
| 4,489,308 A * | 12/1984 | Logan, Jr. et al. | 340/628 |
| 4,954,753 A * | 9/1990 | Sikora | 315/219 |
| 5,420,576 A * | 5/1995 | Matai et al. | 340/7.43 |
| 5,446,440 A * | 8/1995 | Gleason et al. | 340/331 |
| 5,793,184 A * | 8/1998 | O'Connor | 320/101 |
| 6,107,925 A * | 8/2000 | Wong | 340/628 |
| 6,130,610 A * | 10/2000 | Schilsky et al. | 340/539.14 |
| 6,201,977 B1 * | 3/2001 | Cathey et al. | 455/574 |
| 6,225,708 B1 | 5/2001 | Furukawa et al. | |
| 6,255,744 B1 | 7/2001 | Shih et al. | |
| 6,313,744 B1 * | 11/2001 | Capowski et al. | 340/514 |
| 6,502,044 B1 | 12/2002 | Lane et al. | |
| 6,567,001 B1 * | 5/2003 | Barrieau et al. | 340/506 |
| 7,327,178 B2 * | 2/2008 | Cebry | 327/291 |
| 2005/0285570 A1 * | 12/2005 | Kumar et al. | 320/128 |
| 2007/0001819 A1 * | 1/2007 | Becker et al. | 340/286.05 |
| 2008/0203991 A1 * | 8/2008 | Williams | 323/288 |

FOREIGN PATENT DOCUMENTS

| | | |
|---|---|---|
| JP | 2001-203933 A | 7/2001 |
| WO | WO 03/038980 A1 | 5/2003 |

OTHER PUBLICATIONS

International Search Report dated Aug. 5, 2008 for Application No. PCT/US2008/005236.
Korean Office Action.
National Semiconductor, LM3478 High Efficiency Low-Side N-Channel Controller for Switching Regulator, May 2003, National Semiconductor Corporation, DS101355.

* cited by examiner

*Primary Examiner* — Daniel Previl

(57) ABSTRACT

An arrangement for use in a safety notification system includes primary and secondary power sources and a voltage converter. The primary power source provides power to a notification appliance circuit of a notification system. The secondary power source includes at least one battery. The voltage converter is coupled between the battery and the notification appliance circuit of the notification system, and is configured to generate a regulated DC voltage from an output voltage generated by the second power source. In general, the secondary power source is employed when the primary power source is not available or otherwise is not functioning. However, the secondary power source may also be employed in other circumstances.

20 Claims, 5 Drawing Sheets

METHODS AND APPARATUS FOR PROVIDING POWER TO A NOTIFICATION APPLIANCE CIRCUIT

This application claims the benefit of U.S. Provisional Patent Application Ser. No. 60/914,457, filed Apr. 27, 2007, and U.S. Provisional Patent Application Ser. No. 60/914,151, filed Apr. 26, 2007, both of which are incorporated herein by reference.

FIELD OF THE INVENTION

The present invention relates to circuits in building systems that provide signals to devices distributed at different areas of a building or facility.

BACKGROUND

Fire safety systems include, among other things, detection devices and notification devices. Detection devices include smoke, heat or gas detectors that identify a potentially unsafe condition in a building or other facility. Detection devices can also include manually operated pull stations. Notification devices, often referred to as notification appliances, are devices that provide an audible and/or visible notification of an unsafe condition, such as a "fire alarm".

In its simplest form, a fire safety system may be a residential "smoke alarm" that detects the presence of smoke and provides an audible alarm responsive to the detection of smoke. Such a smoke alarm device serves as both a detection device and a notification appliance.

In commercial, industrial, and multiple-unit residential buildings, fire safety systems are more sophisticated. In general, a commercial fire safety system will including one or more fire control panels that serve as distributed control elements. Each fire control panel may be connected to a plurality of distributed detection devices and/or a plurality of distributed notification appliances. The fire control panel serves as a focal point for "problem" indicating signals generated by the distributed detection devices, and as source of activation (i.e. notification) signals for the distributed notification appliances. Most fire safety systems in larger buildings include multiple fire control panels connected by a data network. The fire control panels employ this network to distribute information regarding alarms and maintenance amongst each other. In such a way, notification of a fire or other emergency may be propagated throughout a large facility.

Moreover, centralized control of large safety systems may be accomplished by a dedicated or multi-purpose computing device, such as a personal computer. The computer control station is typically configured to communicate with the multiple fire control panels via the data network.

Using this general architecture, fire safety systems are scalable to accommodate various factors including the building layout, the needs of the building management organization, and the needs of the users of the building. To achieve scalability and flexibility, fire safety systems may include any number of computer control stations, remote access devices, database management systems, multiple networks of control panels, and literally hundreds of detection and notification devices. Fire safety systems may further incorporate and/or interact with security systems, elevator control systems, sprinkler systems, and heating, ventilation and air conditioning ("HVAC") systems.

One of the many sources of costs in fire safety systems is the wiring and material costs associated with the notification appliances. Building safety codes define the specification for notification appliance wiring, voltage and current. For example, according to building safety codes, notification appliances are intended to operate from a nominal 24 volt signal which provides the power for the notification appliance to perform its notification function. For example, an alarm bell, a strobe light, or an electronic audible alarm device operates from a nominal 24 volt supply. In general, however, notification devices are required to operate at voltages as low as 16 volts. The delivery of power to the distributed notification appliances requires a significant amount of wiring and/or a significant number of distributed power sources.

In particular, notification appliances are typically connected in parallel in what is known as a notification appliance circuit or NAC. Each NAC is connected to a power source, such as a 24 volt source, and includes a positive conductor, a ground conductor, and multiple notification appliances connected across the two conductors. The power source may be disposed in a fire control panel or other panel. The positive and ground NAC conductors serve to deliver the operating voltage from the 24 volt power source, to the distributed notification appliances. Because the positive and ground conductors have a finite conductance, i.e. they have impedance, there is a practical limit to how long an NAC may extend from the power source before the voltage available across the NAC conductors falls below the required operating voltage. For example, if copper wire conductors having 0.02 ohms/ft are used, then 100 feet of wire conductors will exhibit 2.0 ohms of resistance. If the power draw through the conductors is 2 amps, then there is a four volt drop of voltage over the 100 feet of wire. The same wire will produce an eight volt drop over 200 feet of wire, which will typically provide too little voltage to devices at the end of the loop.

It is noted that increasing the current draw on the NAC also increases the voltage drop on the NAC because it increases the voltage drop over the resistive conductors. Accordingly, the number of devices on a particular NAC, as well as the length of the NAC, are limited, at least for a given source voltage.

In addition, the power source must be able to provide power to all the NACs in the absence of mains electrical power. Accordingly, while the 24 volt power source of an NAC may ordinary be obtained via conversion of the mains AC electrical power, a battery back-up is also required. In the prior art, two 12-volt batteries have been employed as the secondary power source. Thus, a panel that provides power to an NAC generally requires a source of 24 volts converted from the mains AC electrical power, as well as a battery back-up.

The limitations on NAC physical length and NAC device capacity are exacerbated by this need for the battery backup power. NAC physical length as discussed herein means the length of the power and ground conductors from the power source of the NAC. In general, the actual voltage of the battery backup power source varies from 20.4 to 26.0 volts during the useful life of the batteries. Building code standards require that the NAC be operation throughout the useful life of the battery, and thus when the battery output voltage is as low as 20.4 volts. When the low output source voltage is combined with the voltage drop over the power conductors of the NAC, the ability of the NAC to deliver adequate voltage over long conductor lengths is severely hampered.

To address the limitations of NAC due to voltage drop, extending the coverage of notification appliances often requires increasing the number of power sources. To this end, special powered appliance circuit extension devices may be employed. These powered extension devices are panels that connected to an existing fire control panel and emulate a notification appliance or device. However, the powered extension device provides NAC powered signals to additional NACs. Thus, the powered extension device has its own power source and battery backup power source to power its own NACs. These NACs operate as extensions of the NAC of the fire control panel to which the powered extension device is connected. The use of the powered extension devices effectively extends the coverage that may be achieved with a single fire control panel. The powered extension device is less costly to implement than a fire control panel, but never the less requires additional equipment and battery costs.

One way to extend NAC coverage without adding fire control panels and powered extension devices is to select lower resistance power conductors. For example, a switch from 18 gauge wire to the thicker 14 gauge wire can greatly extend the acceptable length (and/or device capacity) of on NAC. However, thicker wires have significantly higher costs due to the quantity of copper in thicker wires.

Accordingly, there exists a need to reduce costs in notification appliance circuits that arise from the need to provide sufficient voltage and power to notification appliances distributed throughout a building or facility.

SUMMARY OF THE INVENTION

The above described needs, as well as others, is addressed by at least some embodiments of the invention that employ a stabilized NAC source voltage even when powered by batteries that can have low output voltage. In some embodiments, the stabilized NAC source voltage is provided by a switching converter that ensures a stabilized output voltage even when the source voltage (i.e. from the batteries) varies. In preferred embodiments, the stabilized voltage exceeds the nominal voltage in order to allow the NAC to maintain an adequate voltage level over extended lengths, assuming a given current draw.

A first embodiment of the invention is an arrangement for use in a safety notification system that includes primary and secondary power sources and a voltage converter. The primary power source provides power to a notification appliance circuit of a notification system. The secondary power source includes at least one battery. The voltage converter is coupled between the battery and the notification appliance circuit of the notification system, and is configured to generate a regulated DC voltage from an output voltage generated by the second power source. In general, the secondary power source is employed when the primary power source is not available or otherwise is not functioning. However, the secondary power source may also be employed in other circumstances.

A second embodiment is an arrangement for use in a safety notification system that also includes two power sources and a voltage converter. In this embodiment, the primary power source provides at least 24 volts DC to a notification appliance circuit of a notification system. The secondary power source includes at least one battery, and has a useful life defined by an output voltage exceeding 20.4 volts. The voltage converter is coupled between the battery and the notification appliance circuit of the notification system. The voltage converter is configured to generate a DC voltage of at least 24 volts from the output voltage generated by the second power source during the useful life of the secondary power source.

The above describe features and advantages, as well as others, will become more readily apparent to those of ordinary skill in the art by reference to the following detailed description and accompanying drawings.

DETAILED DESCRIPTION

Figure 1:
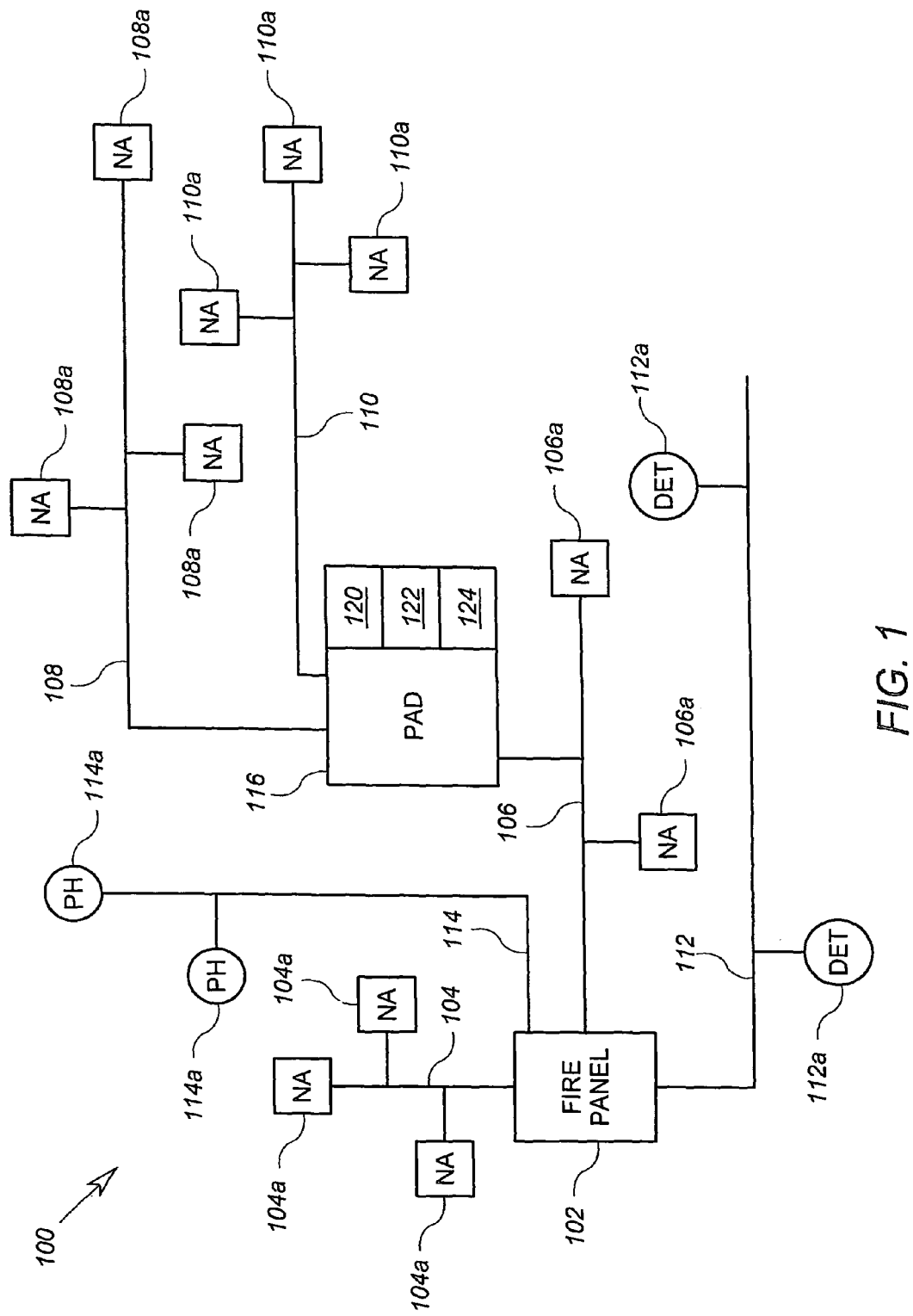
FIG. 1 shows a schematic block diagram of a portion of an exemplary fire safety system that incorporates an embodiment of the present invention.

FIG. 1 shows a safety alarm notification system that incorporates an arrangement according to the invention. The safety alarm notification system 100 includes a fire control panel 102, a plurality of notification appliance loops 104, 106, a plurality of extended notification appliance loops 108 and 110, a plurality of notification appliances 104*a*, 106*a*, 108*a*, 110*a*, a plurality of detector loops 112, 114, a plurality of detection devices 112*a*, 114*a*, and a notification extension system 116. In general, the safety alarm notification system 100 is illustrated in simplified format for exposition purposes. Most safety alarm notification systems will include multiple interconnected control panels, not shown, but similar to the fire control panel 102. Multiple loops and devices would emanate from each fire control panel. Moreover, central control stations and other supervisory and monitoring equipment, not shown, are typically employed. Such devices are omitted from FIG. 1 for clarity of exposition.

The fire control panel, or simply "fire panel," 102 is a device that manages, powers and communicates with the notification appliances 104*a*, 106*a*, 108*a*, 110*a* and the detection devices 112*a*, 114*a*. Specific operations and capabilities of the fire panel 102 will become more readily apparent as the remainder of the system 100 is described below. In any event, the fire panel 102 is preferably a device that is commercially available, such as, for example, the model XLS, MXL, FS250 devices available from Siemens Building Technologies, Inc. In general the fire panel 102 is operable to receive indication of a potential hazard via one or more of the detection devices 112*a*, 114*a* and communicate the existence that indication to a centralized control station, not shown, as well as to other fire panels, also not shown. The fire panel 102 is further configured to provide a signal (and power) to at least the notification appliances 104*a*, 106*a* responsive to a command received from the centralized control station, responsive to a signal received from another fire panel, or responsive to the reception of an indication of a potential hazard via one or more the detection devices 112*a*, 114*a*. The fire panel 102 also has the capability of detecting equipment malfunctions on the device loops 112, 114 and the notification appliance loops 104, 106.

The notification appliances 104*a*, 106*a* are devices that are distributed throughout a building or facility and are configured to provide a visual and/or audible indication of an alarm condition. As is known in the art, notification appliances include alarm bells, electronic alarm devices, strobes, loudspeaker and other similar devices. The notification appliances 104a, 106a are connected to the fire panel 102 via the respective notification appliance loops 104, 106. Notification appliances 104a, 106a are normally in a ready state. In the ready state, no alarm condition is present, but the appliance is capable of generating the notification (i.e. the audible or visual indication) in the event of receiving appropriate inputs from the fire panel 102 via the respective notification appliance loop 104, 106.

The notification appliance loops 104, 106 are the powered conductors that connect the fire panel 102 to the distributed notification appliances 104a, 106a. Regulations require that all notification appliance loops 104, 106 carry the electrical power required for operation of the distributed notification appliances 104a, 106a. As discussed above, there is a practical limit to the length of notification appliance loops 104, 106 because of resistive power losses.

The detection devices 112a, 114a are devices that are distributed throughout a building or facility and are configured to detect a safety hazard, such as the presence of smoke, fire, or noxious gasses. Upon detection of a safety hazard, the detection devices 112a, 114a communicate information indicating the detection to the fire panel 102 via the corresponding detector loop 112. The detection devices 112a, 114a may include network capable smoke detection devices well known in the art, such the FP11, HFP11, HFPO11, available Siemens Building Technologies, Inc. Detection devices 112a, 114a may also include manual pull stations that are triggered by manual action of a building occupant. Such detection devices are well known in the art and are included here only for contextual purposes. The detection loops 112, 114 provide the electrical communication link between the detection devices 112a, 114a and the fire panel 102. Such loops and their operation are also well known in the art.

The notification appliances 108a, 110a may suitably be substantially the same kinds of devices as the notification appliances 104a, 106a. However, the notification appliances 108a, 110a are connected to the notification extension system 116, as will be discussed below in further detail.

The notification extension system 116 is a device that provides an extension from a first notification appliance loop to further appliance loops, in order to extend the range of coverage via the first appliance loop. For example, as shown in FIG. 1, the notification extension system 116 provides an extension from the notification appliance loop 106 to further loops 108, 110. As discussed above, there is a physical distance limitation on notification appliance loops 104, 106 due to voltage losses along the wire of the loops. The notification extension system 116 provides, among other things, a voltage boost sufficient to power the further notification appliance loops 108, 110.

As discussed further above, the notification extension system 116 in some manner emulates a notification appliance to the fire panel 102. To this end, the notification extension system 116 is configured to receive notification signals from the fire panel 102. These notification signals signify that an alarm should be indicated in the same manner as the notification appliances 106a. However, instead of (or in addition to) providing a visual or audible notification in response to such a notification signal, the notification extension system 116 is configured to generate further notification signals and provide these signals to the notification appliances 108a, 110a via the further notification loops 108, 110. Thus, the notification extension system 116 provides greater coverage of the fire panel 102, and the notification appliance loop 106.

In accordance with at least one embodiment of the present invention, the notification extension system 116 includes a primary source 120, a back-up power source 122, and a voltage boost circuit 124. The primary power source 120 is configured to provide a notification signal to the further notification appliances loops 108, 110, wherein the primary power source 120 obtains input power from mains AC electrical power. In this embodiment, the primary power source 120 provides a DC voltage level of 26 volts, which is in excess of the nominal NAC voltage of 24 volts. Because the primary power source 120 provides 26 volts, the notification signal may travel further distances while maintaining a sufficient voltage level for the notification appliances 108a, 110a.

The back-up power source 122 and the voltage boost circuit 124 cooperate to provide a notification signal when the primary power source 120 is not available. For example, in an emergency situation, the mains AC electrical power may not be available. Similar to the primary power source 120, the back-up power source 122 and the voltage boost circuit 124 cooperate to generate a notification signal of in excess of the nominal 24 volts.

The back-up power source 122 comprises, in the exemplary embodiment described herein, a battery arrangement that provides a nominal 20.4-26 volt output that is made available in the event of an interruption to the mains electrical power. The voltage boost circuit 124 is connected between the back-up power source 122 and the notification appliance loops 108, 110. The voltage boost circuit 124 is configured to (at least sometimes) boost the voltage provided by the back-up power source 122 to a consistent level that exceeds the minimal voltage level of the back-up power source 122. Thus, the voltage boost circuit 124 is configured to provide a notification signal having a voltage level that exceeds the lowest nominal voltage level of the back-up power source 122. In this embodiment, the voltage boost circuit 124 provides a consistent output voltage of approximately 26 volts. Thus, when batteries are employed as the back-up power source 122, and have an output range of 20.4 to 26 volts over their useful life, the voltage boost circuit will generate an output notification signal having a consistent voltage (and preferably a consistent voltage that is over 24 volts) at anytime the battery voltage is between 20.4 to 26 volts.

In an alternative embodiment, the back-up power source 122 may be replaced by a battery circuit (or other back-up power source) having a voltage exceeding the useful voltage range of the notification appliances 108a, 110a. In such an alternative, the voltage boost circuit 124 may suitably be replaced by a buck converter that reduces the voltage from the back-up power source 122 to a voltage that approximates the maximum useful voltage of the notification appliances 108a, 110a. By way of example, the back-up power source 122 in this embodiment may consists of three series-connected twelve volt batteries, and the buck converter may suitably convert the 36 volt output of the back-up power source 122 to a voltage below 28 volts, for example, 26 volts.

Referring again to the first embodiment described herein, operation of the circuit of FIG. 1 will be briefly discussed. Under normal circumstances, the notification appliances 104a, 106a, 108a, 110a are in a ready state, but are generate no audible or visible notification signal. These normal circumstances represent the ordinary day-to-day operation of the building in which no fire or other emergency exists. The fire safety system 100, or portions thereof, are tested from time to time to ensure that the system is in a ready state. Occasionally, a malfunction may occur in a notification loop (e.g. 104, 108) or one of the devices (106a, 108a, 112a). These malfunctions may be uncovered by the testing operations.

An alarm event occurs when an unsafe condition has been detected. For example, one of the detector devices 112a may detect a smoke condition indicative of a smoke/fire event. The detector device 112a would effectuate communication of the alarm condition to the fire panel 102. Alternatively, an alarm event may be detected by another device connected to another fire control panel, not shown. Such an alarm event would be communicated to the fire panel 102 by the other fire control panel.

Upon indication of an alarm event, the fire control panel 102 provides a notification signal to each of the notification loops 104, 106. Each of the notification devices 104a, 106a receives the notification signal and generates an audible and/or visible notification that alerts the occupants of the building of the detected unsafe condition. In addition, the notification extension device 116 receives the notification signal from the fire panel 102 via the notification loop 106.

The notification extension device 116 then generates another notification signal for the extension loops 108, 110. If the mains AC electrical power is present, then the notification extension device 116 generates the notification signal using power from the primary power source 120. If the mains AC electrical power is not present, due for example to a power outage, then the notification extension device 116 generates the notification signal using power from the back-up power source 122 and the voltage boost circuit 124. The voltage boost circuit 124 causes the notification signal to be at a sufficient voltage for the length of the extension loops 108 and 110 regardless of the output voltage of the batteries of the back-up power source 122, assuming that the batteries are still within their useful life.

Because of the voltage boost circuit 124, the length of the extension loops 108 and 110 may be designed to be longer than otherwise would be possible if the extension loop was powered directly from the batteries of the back-up power source 122. This provides greater coverage from the notification extension device 116, and thus from the fire panel 102, at reduced costs.

It is noted that the above savings are achieved regardless of whether an alarm event occurs, or whether a mains power outage ever occurs. The savings occur because the increased output voltage allows for a less expensive system implementation. In particular, the building codes that require that the system 100 to be designed to provide adequate voltage under extreme conditions of an alarm event, a power outage, and low battery voltage, may be satisfied with fewer power sources and/or reduced wire thickness.

It is noted that the fire panel 102 itself may employ a back-up power source and voltage boost circuit similar to the back-up power source 122 and voltage boost circuit 124 of the notification extension device 116 to extend the coverage of the loops 104, 106. Indeed, any device that includes as its output a notification appliance circuit, or provides power to one or more NACs, may employ such an arrangement.

Referring generally to the embodiment of FIG. 1 described above, FIG. 2 shows an exemplary block diagram of a notification extension device 202 that may suitably be employed as the notification extension device 116 of FIG. 1.

Figure 2:
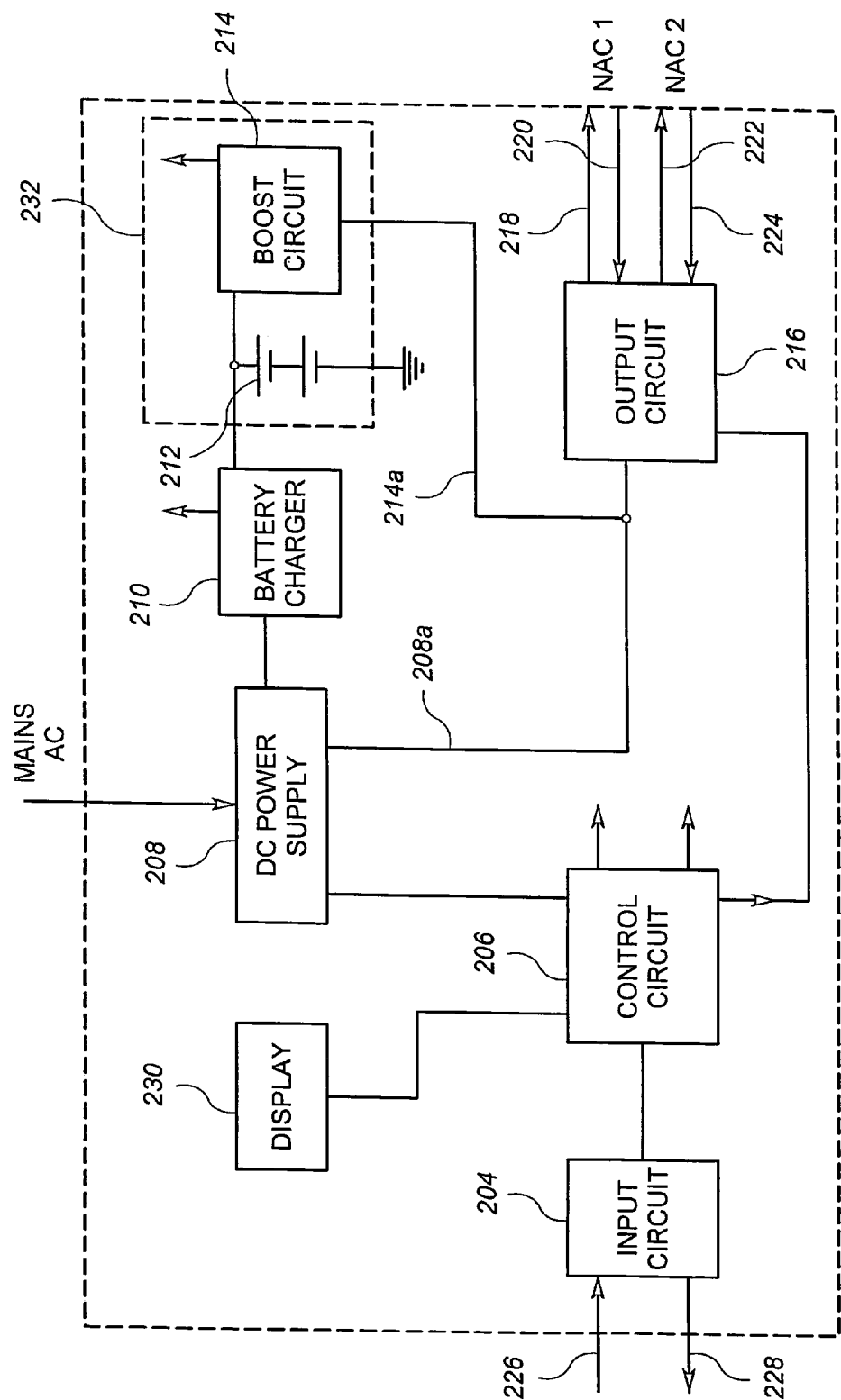
FIG. 2 shows a schematic block diagram of a notification extension device that incorporates an exemplary embodiment of the present invention.

Referring now to FIG. 2, the notification extension device 202 includes an input circuit 204, a control circuit 206, a DC power supply 208, a battery charger circuit 210, a battery circuit 212, a boost circuit 214 and an output circuit 216. The notification extension device 202 also includes NAC inputs 226, 228, NAC outputs 218, 220, 222 and 224, and a display 230. The NAC inputs 226, 228 connect to conductors of a notification loop and are configured to receive notification signals generated by another source via that notification loop. By contrast the NAC outputs 218, 220, 222 and 224 are connected to originate and provide notification signals to devices of two NACs. The NAC outputs 218, 220 connect to the loop conductors of a first NAC, not shown, and the NAC outputs 222, 224 connect to the loop conductors of a second NAC, not shown. In practice, more or less NAC outputs may be employed.

The input circuit 204 is operably coupled to the NAC inputs 226, 228 and is configured to emulate a notification appliance device connected between the NAC inputs 226 and 228. The input circuit 204 is further configured to receive an ordinary 18-24 volt (or approximately 24 volt) notification signal generated between the NAC inputs 226, 228. The input circuit 204 is configured to provide an indication of the existence of the notification signal to the control circuit 206. The details of a suitable input circuit would be known to those of ordinary skill in the art.

The control circuit 206 is a processing circuit that is configured to carry out the logical and supervisory operations of the device 202. To this end, the processing circuit may include a programmable microprocessor or microcontroller. In general, the control circuit 206 is configured to receive an indication that a notification signal has been received at the input circuit 204 and to generate a command causing the output circuit 216 to provide a notification signal on the NAC outputs 218, 220, 222 and 224. The control circuit 206 further provides the signals to enable and disable the DC power supply 208 and the boost circuit 214. The control circuit 206 is also configured to control the indicators on the display 230. The control circuit 206 may also suitably be configured to test battery voltage of the battery circuit 212, as well as to oversee and evaluate tests of the NACs connected to the outputs 218, 220, 222 and 224.

The display 230 may suitably be any device that is capable of communicating at least rudimentary information regarding the devices and/or NACs associated with the device 202. For example, the display 230 may include a plurality of LED indicators, not shown, which are illuminated to indicate a certain condition, such as trouble, a malfunction, circuit power, or other conditions. Suitable display arrangements would be known to those of ordinary skill in the art.

The DC power supply 208 is a power supply circuit that converts mains AC electrical power to 26 volts DC for use by the output circuit 216 in generating notification signals. The DC power supply 208 also provides lower DC voltage values at other outputs, not shown, to power the control circuit 206 and other logical elements in the device 202. The DC power supply 208 in some embodiments provides power to the battery charger 210. The DC power supply 208 may be a well-known configuration of a transformer, diodes and capacitors with little or no output voltage regulation.

The battery charger 210 is a circuit that generates a charging voltage that is provided to the battery circuit 212. Suitable battery charging circuits for use in fire safety equipment are well known in the art.

The battery circuit 212 in this embodiment includes two series-connected 12-volt batteries and generates a nominal voltage of 24 volts DC. As is well known in the art, however, the battery voltage will vary, and the battery circuit 212 may generate 20.4 to 26 volts throughout the useful life of the batteries. The batteries may suitably be lead acid batteries.

Figure 3:
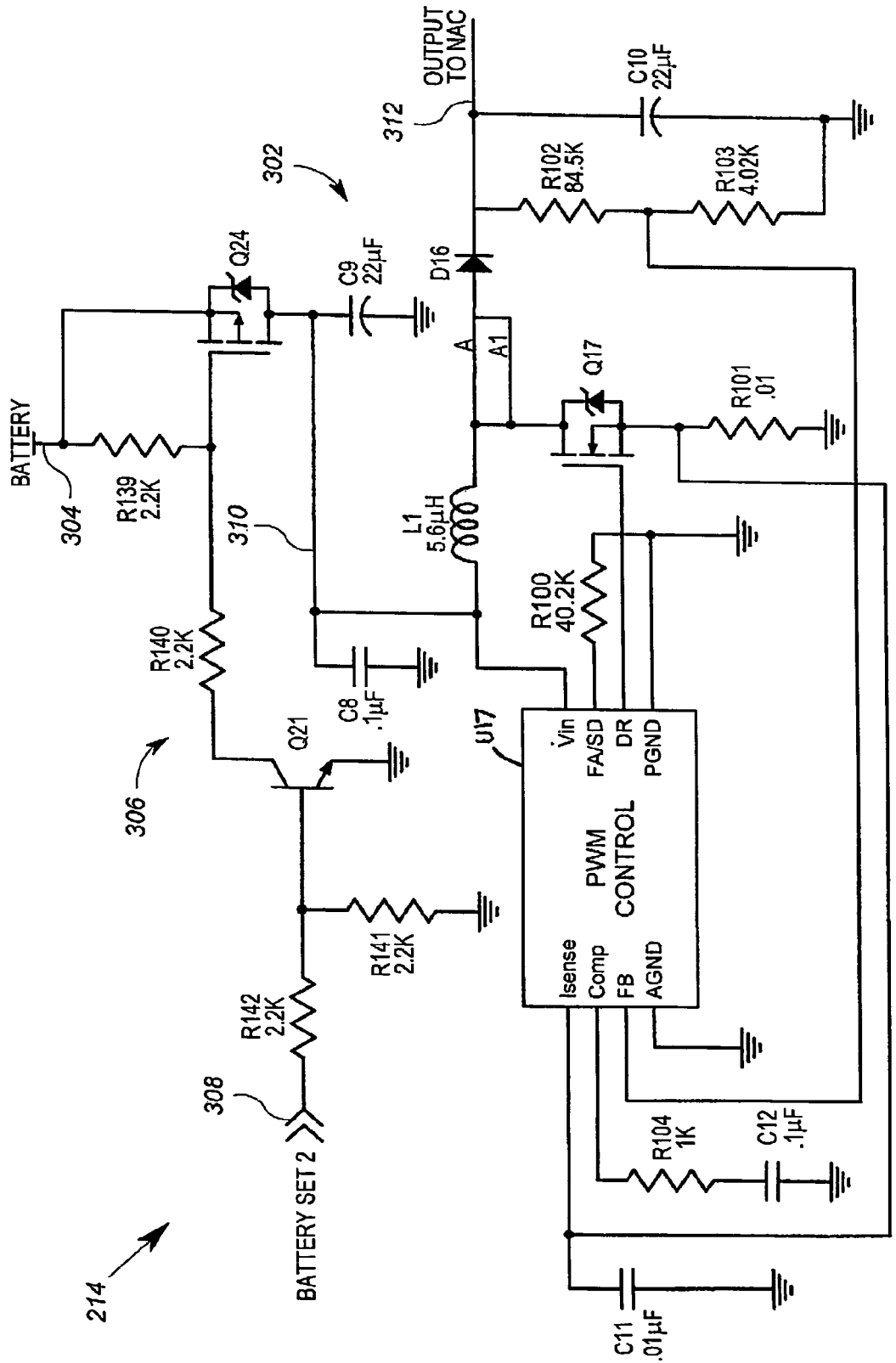
FIG. 3 shows a schematic diagram of a converter circuit that may be used in the back-up power source of the notification extension device of FIG. 2.

The boost circuit 214 is a circuit that receives the output voltage of the battery circuit 212 and generates a substantially consistent output voltage of approximately 26 volts. To this end, the boost circuit 214 may suitably comprise a switching DC-DC converter in the form of a boost converter. Such a circuit would include feedback control of the switch to maintain a consistent output voltage. Further detail regarding an exemplary embodiment of the boost circuit 214 is shown in FIG. 3 and is discussed below.

The battery circuit 212 and the boost circuit 214 thus cooperate to form a DC power back-up unit 232 that provides a consistent output voltage throughout the useful lifetime of the batteries in the battery circuit 212. The DC power back-up unit 232 may be implemented in any fire control device that powers a NAC or other circuit that is normally powered by two 12-volt batteries.

Figure 4:
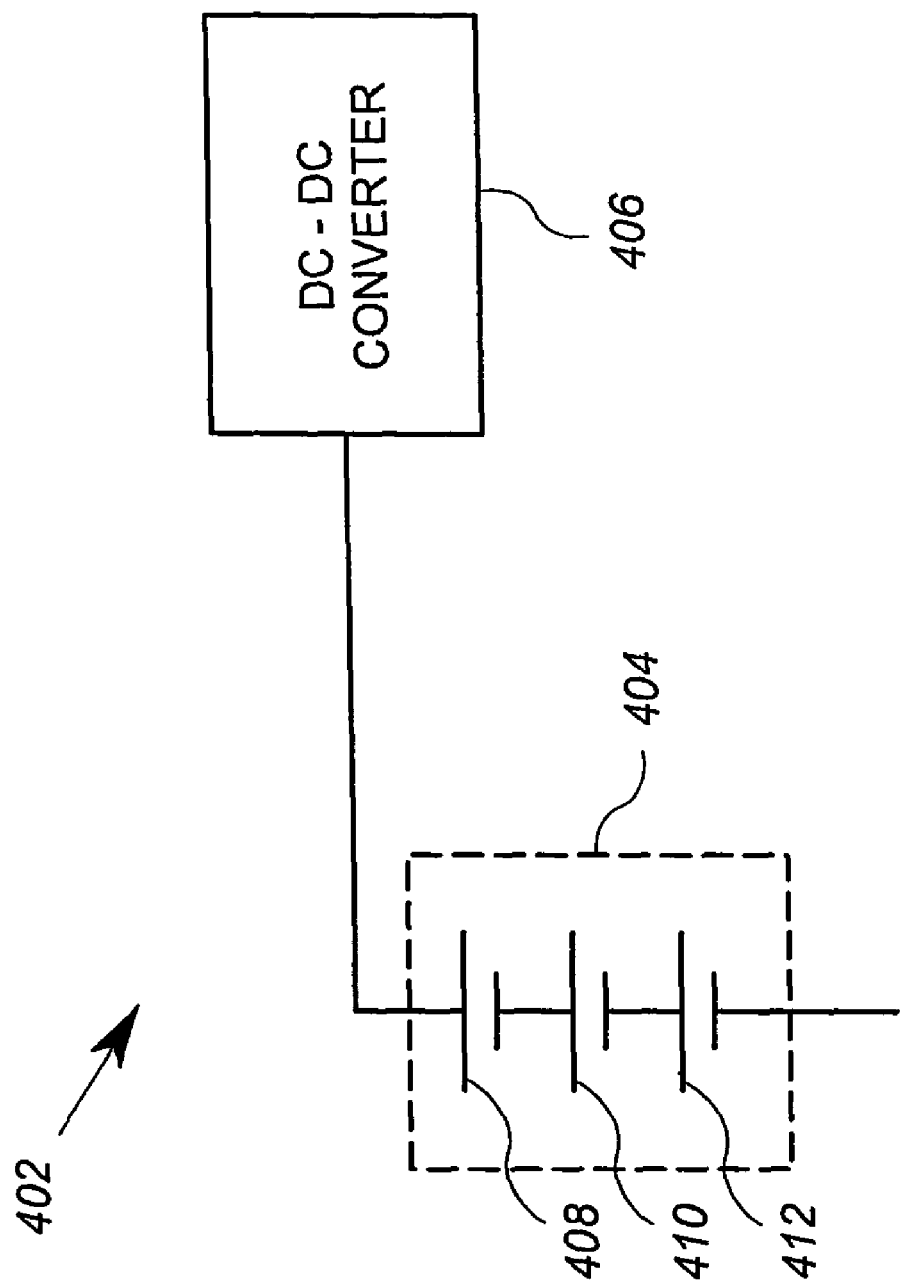
FIG. 4 shows a schematic block diagram of an alternative back-up power source that may be employed in the notification extension device of FIG. 2.

An alternative form of the DC power back-up unit 232 is shown in FIG. 4. In particular, FIG. 4 shows a DC power back-up unit 402 that comprises a battery circuit 404 and a DC-DC switching converter 406. In contrast to the battery circuit 212 of FIG. 2, the battery circuit 404 includes three series-connected 12-volt batteries 408, 410 and 412. In contrast to the boost circuit 214 of FIG. 2, the DC-DC switching converter 406 comprises a buck converter that reduces the 36 volt output voltage of the battery circuit 406 to a suitable NAC voltage below approximately 28 volts, and preferably 24-26 volts DC. The DC power back-up unit 402 may readily be employed in the place of the battery circuit 212 and boost circuit of 214. However, the DC power back-up unit 402 requires additional costs relating to the additional 12-volt battery as compared to the DC power back-up unit 232 shown in FIG. 2.

Referring again to FIG. 2, the output circuit 216 is a circuit that is configured to generate notification signals under the command of the control circuit 206. The power for the notification signals is derived from the output voltage of either the DC power supply 208 or the boost circuit 214 to the NAC outputs 218, 220, 222 and 224. In a preferred embodiment, the output circuit 216 includes a hot swap controller to handle short, instantaneous current spikes that can occur when notification appliances are initially powered. In particular, when the output circuit 216 generates a notification signal on the NAC outputs 218, 220, 222 and 224, the notification appliances connected to the NAC outputs 218, 220, 222 and 224 can generate an initial current spike. During this spike, the hot swap controller of the output circuit 216 temporarily provides the necessary current to protect the internal devices during the brief surge.

In operation, the notification extension device 202 monitors the NAC input 226, 228 for a notification signal indicative of trouble, or any other reason that the notification devices should be activated. Upon detection of a notification signal at the NAC input 226, 228, the input circuit 204 provides a logical indication signal to the control circuit 206. The control circuit 206, responsive to receiving the indication signal from the input circuit 204, provides a signal the output circuit indicating that the output circuit 216 should generate a notification signal on the NAC outputs 218, 220, 222 and 224.

The control circuit 206 further enables the output 208a of the DC power supply 208 if the mains AC power is available. In such a case, the control circuit 206 furthermore disables the output of the boost circuit 214. As a consequence, only the DC power supply 208, and not the DC back-up power unit 232, provides the signal power to the output circuit 216. In the event that the mains AC electrical power is not available, the control circuit 206 disables the output 208a of the DC power supply 208 and enables the output 214a of the boost circuit 214. As a result, the DC power back-up unit 232 formed by the battery circuit 212 and the boost circuit 214 provides the power to the output circuit 216.

The output circuit 216 then provides the notification signal to the NAC outputs 218, 220, 222 and 224 using the power provided by either the DC power back-up unit 232 or the DC power supply 208. In some cases, the control circuit 206 and the output circuit 216 cooperate to modulate information or strobe trigger signals on the notification signal. Such operations are known in the art.

The above described device thus provides notification signals having a voltage that is relatively consistent, regardless of the exact output voltage of the battery circuit 212, assuming that the battery circuit 212 is operating within acceptable ranges. In this embodiment, the relatively consistent voltage exceeds the nominal rated 24 volts DC of the battery circuit 212.

As a consequence, the NACs attached to the NAC outputs 218, 220, 222 and 224 need not be designed for the worst case scenario of 20.4 (or similarly low) output voltage of the battery circuit 212. Because the boost circuit 214 maintains output voltage at a level exceeding the lowest acceptable battery circuit voltage, and preferably at or exceeding the nominal 24 volts, the NACs may be designed using a higher NAC voltage assumption. This allows for longer NAC coverage, and/or the use of less expensive higher gauge wiring.

It will be appreciated that a notification extension device 202 of FIG. 2, or alternatively of any power source that provides power to NACs, will typically be capable of connecting to more than one or two NACs. In such a case, it is preferable that separate boost circuits 214 be implemented on only those NACs that require the boost to avoid costs. This will allow the individual boost circuits to employ smaller and cheaper components as compared to a single boost circuit that provides power to all NACs, whether or not they require the boost.

FIG. 3 shows an exemplary embodiment of the boost circuit 214 of FIG. 2. The exemplary boost circuit 214 of FIG. 3 includes a DC-DC boost converter 302, a battery input 304 and an enable circuit 306. The enable circuit 306 includes an enable input 308 operably coupled to the base of an NPN transistor Q21 via a voltage divider formed by resistors R141, R142 having substantial equivalent resistance values. The enable input 308 is operably coupled to receive a battery select or enable signal from the control circuit 206 of FIG. 2, not shown in FIG. 3.

The collector of the transistor Q21 is coupled to the gate of a MOSFET switch Q24 via a resistor R140. The gate of the MOSFET switch Q24 is further coupled to the battery input 304 via resistor R139. The resistors R139 and R140 also have an equivalent resistance. By way of example, resistors R139, R140, R141 and R142 may all have a resistance value of 2.2 k-ohms. The battery input 304 is operably coupled to the output voltage of the battery circuit 212 of FIG. 2, and is therefore configured to receive a DC voltage of at least approximately between 20 and 26 volts.

The battery input 306 is coupled to the input 310 of the DC-DC converter 302 via the output (source-drain) path of the MOSFET switch Q24. The main signal path of the DC-DC converter between the input 310 and the output 312 consists of an input inductor L1, a MOSFET switcher Q17, an output rectifying diode D16, and an output capacitor C10. The input inductor L1 is coupled between the input 310 and the junction between the output diode D16 and the drain terminal of the switcher Q17. The source terminal of the switcher Q17 is coupled to ground via a low resistance current sense resistor R101. The output terminal of the diode D16 forms the circuit output 312. The output capacitor C10 is coupled between the output 312 and ground.

The gate of the switcher Q17 is operably connected to a PWM control device U17. The PWM control device U17 generates a drive signal that is pulse-width modulated in manner that controls the output voltage of the converter 302.

The PWM control device U17 may be any suitable PWM drive signal generator, including the model LM3478MM PWM control device available from National Semiconductor. The control device U17 monitors the input voltage of the converter 302, the current through the switcher Q17, and the output voltage of the converter 302 in order to modulate the PWM signal in a manner that maintains a steady DC output, even in the case of varying input voltage and varying load currents. In this embodiment, the control device U17 is configured to generate a relatively constant output voltage of 26 volts at least during the useful life of the batteries in the battery circuit, i.e. from 20.4 volts to 26 volts.

To this end, the PWM control device U17 is operably coupled to receive the input voltage from the input 310, a voltage representative of the current through the switcher Q17 from the sense resistor R101, and the output voltage from a voltage divider formed by resistors R102, R103, which are series-connected from the output 312 to ground.

The switching frequency of the control device U17 in this embodiment is approximately 400 kHz. When the model LM3478MM PWM control device is used as the control device U17, this frequency may be set by connecting the resistor R100 (40.2 k-ohm for 400 kHz) between the FA/SD pin of the control device U17 and ground.

The bias power input of the control device U17 is connected to the converter input 310. Because the converter input 310 only receives power when the MOSFET switch Q24 is closed (responsive to an enable signal), the control device U17 only operates when the MOSFET switch Q24 is closed. As a consequence, the control device U17 only operates when the enable signal has been received on the enable input 308.

In ordinary operation, the battery enable signal will not be present. In particular, as long as mains AC electrical power is available, there is no need to obtain voltage from the battery circuit. In the absence of the enable signal at the input 308, the transistor Q21 acts as an open circuit and the MOSFET switch Q24 is opened. No battery voltage reaches the converter input 310, and thus no voltage reaches the bias power input of the control device U17. Thus, the converter circuit 302 receives neither an input voltage nor bias voltage for the drive circuit control device U17. Under these conditions, the converter 302 produces no output power on the output 312.

However, in the event of a loss of mains AC electrical power, or in the event of a test operation, the control circuit 206 of FIG. 2 provides the battery enable signal to the input 308. The enable signal causes the transistor Q21 to turn on, which in turn causes the MOSFET switch Q24 to connect the battery input 304 to the converter input 310. As a consequence, the battery voltage is applied to the bias input of the control device U17 and to the inductor L1. The control device U17 thereafter generates a PWM drive signal that causes the switcher Q17 to switch at a controlled rate. The switching of the switcher Q17, combined with the operation of the inductor L1, the capacitor C10 and the rectifier D16, generate a regulated output of greater than 24 volts, and in this embodiment, approximately 26 volts.

If the battery voltage at the battery input 304 is close to 26 volts, then the battery voltage passes through the rectifier D16 and L1 with little or no conversion.

As the battery voltage drops over the useful lifetime of the batteries, the input voltage at the input 310 will drop. The control device U17, however, adjusts the drive signal in order to maintain a relatively constant output voltage even as the battery voltage drops. The output voltage is maintained as a result of the feedback provided by the output voltage from the voltage divider formed by resistors R102, R103, and/or the current feedback provided by the sense resistor R101. Such operations are carried out by the PWM control device U17.

Thus, the above circuit provides an improvement over fire alarm notification circuits that rely more or less directly on battery voltage as a secondary power source. In particular, the NACs connected to the NAC outputs of the device need not be configured under a worst case scenario of an output of 20.4 volts, but rather the output voltage of the converter 302, which may be over 24 volts and is preferably approximately 26 volts. This circuit allows for sufficient notification signal voltage over much longer lengths of wire as compared devices power directly from batteries that have a lowest useful output voltage of approximately 20 volts.

As discussed above, the DC power back-up unit 232 and/or 402 of FIGS. 2, 3 and 4 may readily be employed in any device that provides power to a notification appliance circuit, and need not be limited to the extension device illustrated in FIG. 2. However, the combination of the extension device and DC power back-up unit of FIG. 2 provides particular advantages in that the combination can extend the effective coverage of NACs by significant amounts without requiring additional fire control panels.

It will further be appreciated that the boost circuit 214 may suitably be implemented on an NAC by NAC basis. Thus, when an NAC power source NAC does not require the boost circuit 214, the cost associated with the boost circuit 214 may be avoided. A boost circuit would typically not be necessary where lengthening or extending the NAC loop will not provide significant cost advantages, particularly when low cost wire is already being implemented. For example, if the design of a system requires that a particular NAC only have a short NAC loop, then it may not be advantageous to include the boost circuit in that case because the original design specifications with the batteries connected directly to the NAC may be sufficient. Moreover, because the boost circuit 214 may be designed for an individual NAC, as opposed to an entire output of a power source, it can have smaller and cheaper components.

In one exemplary implementation, referring to FIG. 2, it may be possible to employ a different output circuit 216 for each NAC (or pair of NACs), with a separate boost circuit 214 that is optionally provided in connection with any or all of the output circuits.

It will also be appreciated that the DC voltage stability provided by a DC-DC converter such as that shown in FIG. 3 can in some circumstances provide advantages even when power is supplied by the mains AC electrical power. To this end, FIG. 5 shows an exemplary embodiment where a DC-DC converter 510 is connected in series between both the primary (AC powered) power source 502 and the second (battery) power source 504.

Figure 5:
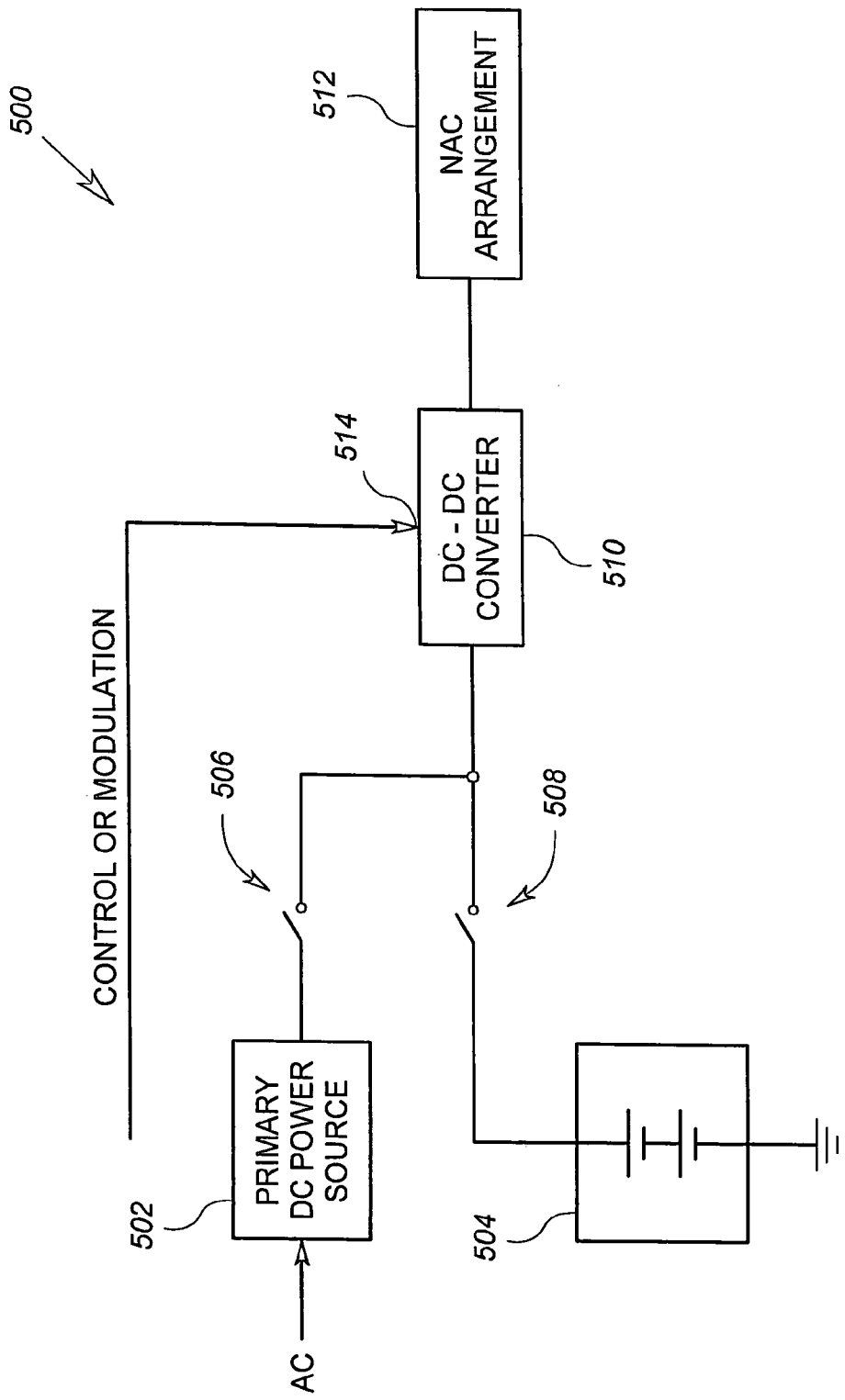
FIG. 5 shows a schematic block diagram of an exemplary NAC power arrangement that incorporates some embodiments of the invention.

In particular, FIG. 5 shows an NAC power arrangement 500 that includes a primary power source 502, a secondary power source 504, a first enable switch 506, a second enable switch 508, a DC-DC converter 510, and an NAC arrangement 512. The primary power source 502 is configured to convert AC mains power into DC power for use in an NAC. The primary power source 502 may suitably be substantially the same as embodiments of the DC power supply 208 of FIG. 2. In this case, the primary power source 502 is a well-known, simple AC-DC converter that provides no real regulation as the input voltage is assumed to be regulated as mains AC power.

The secondary power source 504 may suitably be a battery circuit similar to the battery circuit 212 of FIG. 2. The first and second enable switches 506, 508 are suitably switching mechanisms (such as MOSFETs) that couple the respective outputs of the power sources 502, 504 to the DC-DC converter 510. The DC-DC converter 510 may suitably be the converter 302 of FIG. 3, or even the entire boost circuit 214 of FIGS. 2, 3. In the latter case, the enable switches 506, 508 would couple to the "BATTERY" input 304 of the circuit of FIG. 3.

The NAC arrangement 512 may suitably be an NAC loop including the power conductors and the actual notification appliance devices similar to those shown in FIG. 1. The NAC arrangement may also include, if necessary, a separate output circuit such as the output circuit 216 that is capable of adding intelligence, features or modulation to the notification signals.

In operation, the primary power source 502 operates to provide power to the NAC arrangement 512 via the DC-DC converter 510 when mains AC electrical power is available, and the secondary power source 504 operates to provide power to the NAC arrangement via the DC-DC converter 510 when mains AC electrical power is unavailable. To this end, the enable switch 506 is controllably operated to connect the primary power source 502 to the DC-DC converter 510 when mains AC electrical power is available, and the enable switch 508 is controllably operated to connect the secondary power source 504 to the DC-DC converter 510 when the mains AC electrical power is unavailable.

The DC-DC converter 510, similar to the boost circuit 214 and/or power converter 302, provides a regulated output voltage in response to a range of input voltages. Thus, when the switch 506 is closed, the DC-DC converter 510 provides a consistent voltage (e.g. 24-26 volts) even if the output of the primary power source 502 sags, due for example, to brownout conditions in the mains AC power lines. Likewise, when the switch 508 is closed, the DC-DC converter 510 provides a consistent voltage (e.g. 24-26 volts) even as the battery output voltage declines as the batteries lose charge. In such a case, the NAC arrangement 512 receives a predictable power source regardless of battery charge, or mains AC power fluctuations.

In addition, if a circuit similar to the boost circuit 214 of FIG. 3 is used as the DC-DC converter 510, the DC-DC converter 510 provides an extra advantage of having a digital "enable input" (i.e. input 308 of FIG. 3) that may be used to activate, deactivate, and even modulate the NAC signal to the NAC arrangement 512. In particular, by providing suitable control or modulation signals to the input 514 of the DC-DC converter 510, the notification signal may be provided with embedded information, even without the use of a separate "output circuit" similar to the output circuit 216 of FIG. 2.

The embodiment of FIG. 5 may also benefit if the DC-DC converter 510 is configured as a boost/buck converter. Such a converter could then provide a regulated output voltage even if the input voltage exceeds a specified range. Such a circuit may be useful if the battery circuit of the secondary power supply 504 is designed to have an excessive output voltage similar to the embodiment of FIG. 4.

It will be appreciated that the above describe embodiments are merely exemplary. Those of ordinary skill in the art may readily devise their own modifications and implementations that incorporate the principles of the present invention and fall within the spirit and scope thereof.

I claim:

1. An arrangement for use in a safety notification system, comprising:
   a) a primary power source, the primary power source providing power to a notification appliance circuit of a notification system;
   b) a secondary power source including at least one battery;
   c) a voltage converter coupled between the battery and the notification appliance circuit of the notification system, the voltage converter configured to generate a regulated DC voltage from an output voltage generated by the secondary power source.

2. The arrangement of claim 1, wherein the output voltage of the at least one battery exceeds the minimum rated voltage for the notification appliance circuit.

3. The arrangement of claim 1, wherein:
   the secondary power source includes two twelve-volt rated batteries; and
   the voltage converter provides an output of at least about 26 volts.

4. The arrangement of claim 1, wherein
   the voltage converter comprises a boost converter.

5. The arrangement of claim 1 wherein an output voltage of the primary power source and the regulated DC voltage exceeds a nominal voltage of the secondary power source.

6. The arrangement of claim 1 wherein the voltage converter is configured to generate the regulated DC voltage when the output voltage generated by the secondary power source varies by as much as five volts.

7. The arrangement of claim 1, wherein:
   the secondary power source includes three twelve-volt rated batteries; and
   the voltage converter provides an output of less than 28 volts.

8. The arrangement of claim 1 wherein the notification appliance circuit comprises a plurality of spaced-apart notification appliances.

9. The arrangement of claim 1 wherein the voltage converter is configured to provide power to the notification appliance circuit of the notification system when the primary power source becomes unavailable.

10. An arrangement for use in a safety notification system, comprising:
    a) a primary power source, the primary power source providing at least 24 volts DC to a notification appliance circuit of a notification system;
    b) a secondary power source including at least one battery, the secondary power source having a useful life defined by an output voltage exceeding 20.4 volts;
    c) a voltage converter coupled between the battery and the notification appliance circuit of the notification system, the voltage converter configured to generate a DC voltage of at least 24 volts from the output voltage generated by the secondary power source during the useful life of the secondary power source.

11. The arrangement of claim 10, wherein:
    the secondary power source includes two twelve-volt rated batteries; and
    the voltage converter provides an output of at least about 26 volts.

12. The arrangement of claim 10, wherein
    the voltage converter comprises a boost converter.

13. The arrangement of claim 10 wherein an output voltage of the primary power source and the regulated DC voltage exceeds a nominal voltage of the secondary power source.

14. The arrangement of claim 10, wherein the voltage converter comprises a switching converter.

15. The arrangement of claim 10, wherein the voltage converter further comprises:
    a MOSFET switch;
    an input inductance coupled between a converter input and the MOSFET switch;
    a rectifier coupled between a converter output and the MOSFET switch;

a capacitor coupled between the converter output and a reference voltage; and a PWM control unit coupled to a gate of the MOSFET switch.

16. The arrangement of claim 15, further comprising:

a controllable switch coupled between the secondary power source and the converter input, the controllable switch having a control terminal;

an enable circuit having a logical enable input, the enable circuit operable coupled to the control input of the controllable switch.

17. The arrangement of claim 16, further comprising a control circuit, the control circuit configured to:

obtain an indication that the primary power source is malfunctioning;

generate, responsive the obtained indication, the enable signal such that the controllable switch controllably connects the secondary power source to the voltage converter.

18. The arrangement of claim 10, wherein the notification appliance circuit includes a plurality of spaced-apart notification appliances of the safety notification system.

19. The arrangement of claim 18, further comprising the plurality of spaced-apart notification appliances.

20. An arrangement for use in a safety notification system, comprising:

a) a primary power source, the primary power source providing power to a plurality of spaced-apart notification appliances in a notification appliance circuit of a notification system;

b) a secondary power source including at least one battery;

c) a voltage converter coupled between the battery and the notification appliance circuit of the notification system, the voltage converter configured to generate a regulated DC voltage from an output voltage generated by the secondary power source, wherein the generated DC voltage provides power to the plurality of spaced-apart notification appliances when the primary power source becomes unavailable.

* * * * *